(12) United States Patent
Havener

(10) Patent No.: US 7,058,483 B2
(45) Date of Patent: *Jun. 6, 2006

(54) METHOD AND APPARATUS FOR MAXIMIZING POWER USAGE IN A POWER PLANT

(75) Inventor: John P. Havener, Austin, TX (US)

(73) Assignee: Pavilion Technologies, Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/755,719

(22) Filed: Jan. 12, 2004

(65) Prior Publication Data

US 2004/0199268 A1    Oct. 7, 2004

Related U.S. Application Data

(63) Continuation of application No. 09/676,043, filed on Sep. 28, 2000, now Pat. No. 6,678,585.

(60) Provisional application No. 60/156,472, filed on Sep. 28, 1999.

(51) Int. Cl.
  *G05D 11/00* (2006.01)

(52) U.S. Cl. ............................ 700/295; 700/28; 706/21

(58) Field of Classification Search ................ 700/295, 700/28, 286, 288, 44; 706/17, 21, 55, 52, 706/25

See application file for complete search history.

(56) References Cited

U.S. PATENT DOCUMENTS

| | | | |
|---|---|---|---|
| 4,815,014 A * | 3/1989 | Lipner et al. ............... | 702/184 |
| 5,479,573 A | 12/1995 | Keller et al. | |
| 5,704,011 A | 12/1997 | Hansen et al. | |
| 5,720,003 A * | 2/1998 | Chiang et al. ................ | 706/21 |
| 5,768,475 A | 6/1998 | Godbole et al. | |
| 5,782,432 A | 7/1998 | Renshaw | |
| 5,842,189 A * | 11/1998 | Keeler et al. ................. | 706/16 |
| 6,002,839 A * | 12/1999 | Keeler et al. ................. | 706/23 |
| 6,102,958 A * | 8/2000 | Meystel et al. ............... | 703/2 |
| 6,144,952 A | 11/2000 | Keeler et al. | |
| 6,404,437 B1 | 6/2002 | Russell et al. | |
| 6,594,620 B1 | 7/2003 | Qin et al. | |

* cited by examiner

*Primary Examiner*—Zoila Cabrera
(74) *Attorney, Agent, or Firm*—Howison & Arnott, L.L.P.

(57) ABSTRACT

A method for controlling a plant to achieve desired operating results. Select operating parameters of the plant are measured and input to a plurality of transforms that define select actions to be taken by an operator of the plant as a function of the measured select operating parameters. Each of the transforms is associated with a portion of the measured select operating parameters and is operable to determine if a predetermined and associated condition exists in the plant, which would warrant the associated action being taken. The measured select operating parameters are processed through the associated transforms to determine for each of the transforms if the associated condition is present. An indication that the condition associated with any of the transforms is present, and for which transform, is provided to a user. A suggestion of the action to be taken for the associated indication is then provided to the user.

8 Claims, 4 Drawing Sheets

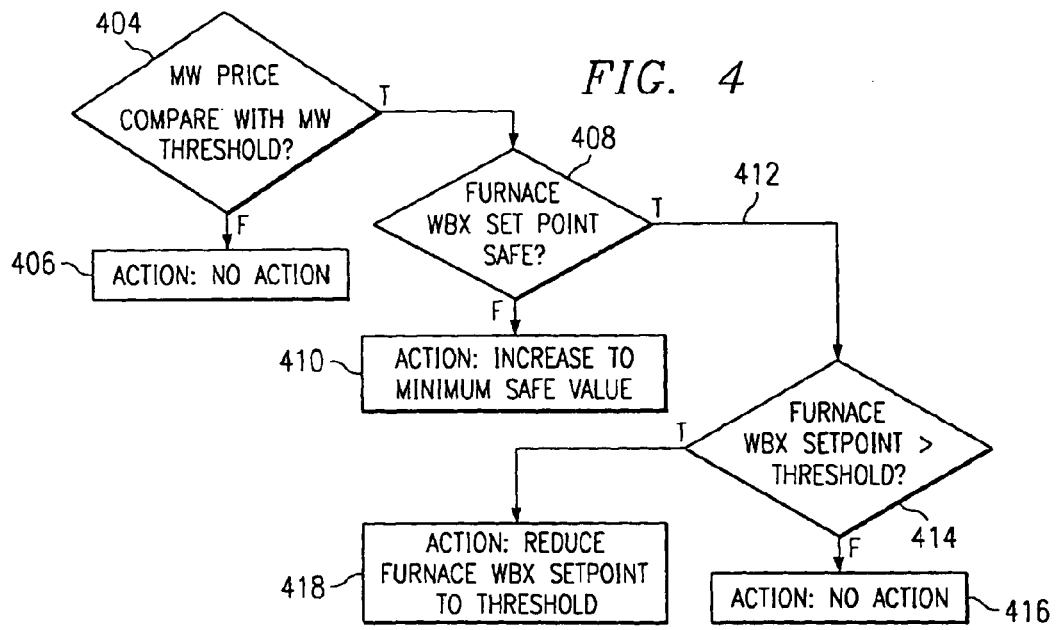
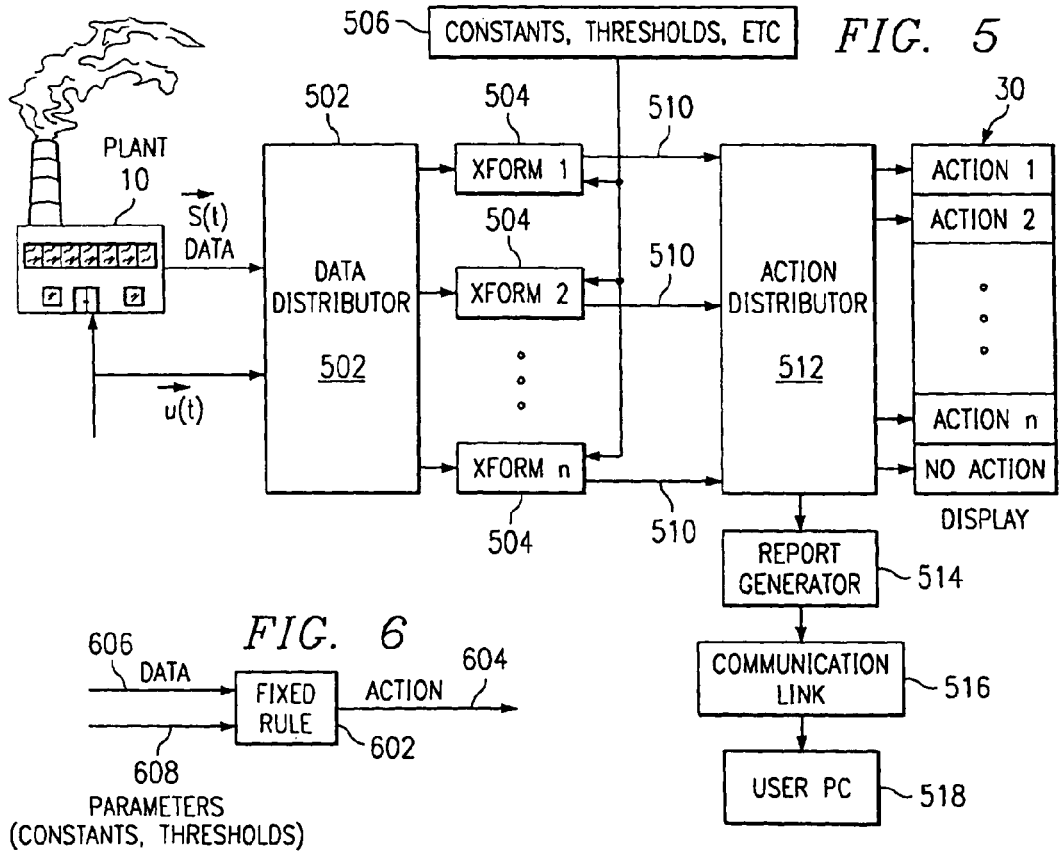

METHOD AND APPARATUS FOR MAXIMIZING POWER USAGE IN A POWER PLANT

CROSS-REFERENCE TO RELATED APPLICATIONS

This application is a continuation of U.S. patent application Ser. No. 09/676,043, filed Sep. 28, 2000, now U.S. Pat. No. 6,678,585 entitled "METHOD AND APPARATUS FOR MAXIMIZING POWER USAGE IN A POWER PLANT," which is related to U.S. Provisional Patent Application Ser. No. 60/156,472, filed Sep. 28, 1999 entitled "METHOD AND APPARATUS FOR MAXIMIZING POWER USAGE IN A POWER PLANT."

TECHNICAL FIELD OF THE INVENTION

The present invention pertains in general to air limited power plants and, more particularly, to a system for optimizing the operation of a power plant with respect to maximizing the output power thereof.

BACKGROUND OF THE INVENTION

Power generators have the requirement to provide power in an "on demand" mode. They must generate, on occasion, every last megawatt possible. Normally, most plants will operate from a cost standpoint to maximize the cost per megawatt to operate to minimize certain parameters or to stay within certain federally regulated guidelines, such as for NOx. However, plants have a finite size and output capability and, therefore, all these parameters are defined in terms of the particular megawatts that are generated. In some situations, such as times of peak consumer demand for power on very hot summer days or very cold winter days, the demand on a particular power plant is such that generation of the maximum number of megawatts is a primary goal. The reason for this is that, during these times, the price of an additional megawatts is very high. If a producer is unable to deliver the desired megawatts, they may be required to purchase power at these higher costs to supply their consumer's needs. It would therefor be desirable to produce as many of the additional megawatts as possible before buying this additional power.

At present, power plants utilize a control system for controlling the overall operation of the plant, which control system is interfaced with an operator to allow the operator to adjust various parameters of the power plant. By reading the outputs of the power plant, such as furnace temperatures, etc., the operator can determine certain parameters of the operation thereof. These are typically manipulated via adjustment of the setpoints applied to the controller to allow the power plant to function in a certain manner. Each operator may have a different manner by which they adjust the operation of the plant through the setpoints and, as such, the plant can operate in many different modes, depending upon which operator is actually on call at the time. Further, the goals for the operation of the plant, although generally stated to the operators, is sometimes difficult to achieve with the current available tools for controlling the system. It is not that the control system does not provide the ability to control the plant to achieve a desired operating condition but, rather, it is the ability to interpret all of the outputs of the plant as a whole and make a decision based upon all of the outputs as to achieving a particular goal, such as extracting additional megawatts out of the system.

SUMMARY OF THE INVENTION

The invention disclosed and claimed herein is a method for controlling a plant to achieve desired operating results. Select operating parameters of the plant are measured and input to a plurality of transforms that define select actions to be taken by an operator of the plant as a function of the measured select operating parameters. Each of the transforms is associated with a portion of the measured select operating parameters and is operable to determine if a predetermined and associated condition exists in the plant, which would warrant the associated action being taken. The measured select operating parameters are processed through the associated transforms to determine for each of the transforms if the associated condition is present. An indication that the condition associated with any of the transforms is present, and for which transform, is provided to a user. A suggestion of the action to be taken for the associated indication is then provided to the user.

BRIEF DESCRIPTION OF THE DRAWINGS

For a more complete understanding of the present invention and the advantages thereof, reference is now made to the following description taken in conjunction with the accompanying Drawings in which:

FIG. 4 illustrates a diagrammatic view of the decision tree determination;

FIG. 5 illustrates a block diagram of the maximizing operation;

FIG. 6 illustrates a block diagram of the fixed rule operation;

DETAILED DESCRIPTION OF THE INVENTION

Figure 1:
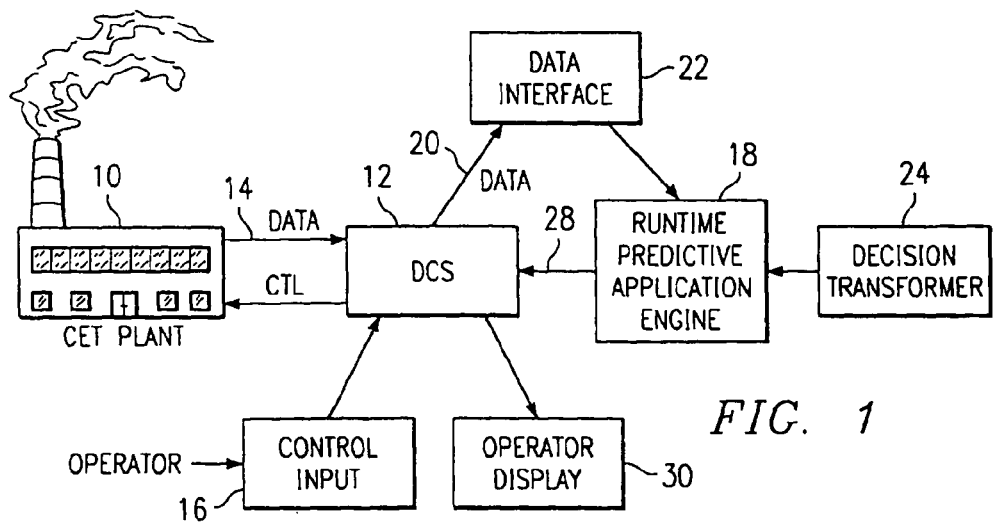
FIG. 1 illustrates a block diagram of the overall system for maximizing output power from a plant.

Referring now to FIG. 1, there is illustrated a block diagram of a power plant 10, which power plant 10, which is an air-limited power plant having multiple levels of coal firing. The general operation of this plant in conjunction with a control system is described in U.S. patent application Ser. No. 09/224,648, filed Dec. 31, 1998, and entitled "A METHOD FOR OPTIMIZING A PLANT WITH MULTIPLE INPUTS," which is a Continuation-in-Part application of U.S. patent application Ser. No. 09/167,504, filed Oct. 6, 1998, and entitled "A METHOD FOR ON-LINE OPTIMIZATION OF A PLANT," both of which are incorporated herein by reference.

The plant 10 is controlled by a Distributed Control System (DCS) 12, which is operable to generate control values in the form of plant inputs u(t). These control inputs control the overall operation of the plant 10. In addition, the information regarding the operation of the plant 10 in the form of such things as flow values, pressure values, temperature values, etc., are returned back to the DCS 12 along a data line 14 as measurable values. The DCS 12 is controlled by an operator through various control inputs in a box 16. These control inputs in block 16 allow the operator to manipulate the u(t) values to the plant 10.

The system of the present disclosure utilizes a runtime predictive application engine 18, which is basically a predictive system as described in U.S. Pat. Nos. 5,479,573 and 5,782,432, which are incorporated herein by reference. This system receives certain data from the DCS 12 along a data line 20 via a data interface 22 for input to the application engine 18. The application engine 18 is operable to utilize this data, which constitutes a portion of the control data to the plant and the state values or measured values from the plant 10. These values are utilized in a predictive manner to both predict certain output values of the plant and also to process certain transforms, as will be described hereinbelow. These transforms are decision transforms which are stored in a block 24. The application engine 18 is operable to process the received data through the application engine 18 to provide certain predicted values and certain measured values received from the DCS 12, process these values through the transforms and then provide an output to the DCS on line 28. The DCS 28 then interfaces with an operator display 30, which operator display is operable to provide the operator with certain indications as to the operation of the plant and advice on certain actions to be taken in order to assist the operator in manipulating the operation of the plant, i.e, defining various setpoints for the DCS 12, the primary object being to maximize power output. It is understood that, whenever the operator inputs values or setpoints into the control input box 16, this will result in a change in the operation of the plant 10. This change, as will be described hereinbelow, will then result in new data that is processed through the transforms and suggested actions, if any, displayed to the operator in order to possibly indicate to the operator certain modifications to the setpoints. For example, if there is an increase in power demand and the operator dials a higher megawatt level on the plant, the indication may be that the plant cannot deliver the desired megawatts due to various settings. Utilizing the decision transforms, certain "fixed rules" can be applied that will allow the operator to modify certain setpoints in order to improve some aspect of the operation of the plant to extract additional megawatts. These rules operate on various information output from the plant such as temperature, flow rate, pressures, etc., as will be described hereinbelow.

Figure 2:
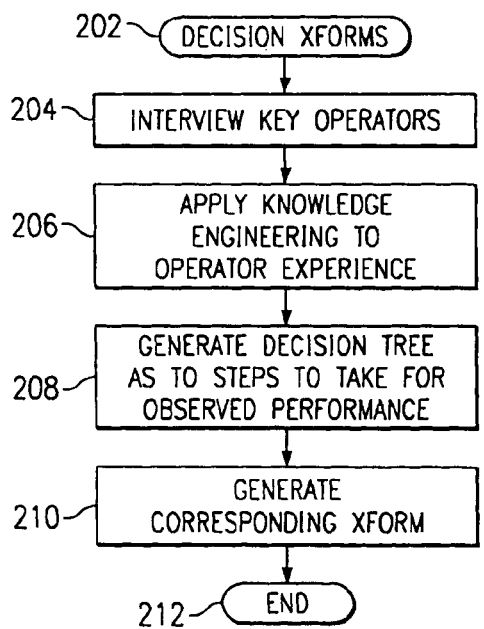
FIG. 2 illustrates a flowchart for providing decision transforms.

Referring now to FIG. 2, there is illustrated a flowchart depicting the operation of generating the transforms. This is initiated at a block 202. In general, the manner by which the transforms are generated is to first conduct engineer interviews with key operators of a system, as indicated by a function block 204. These operators are selected on the basis of their demonstrated past history of being able to extract a few more megawatts out of the plant operation, this being an intuitive operation on the part of the operators. Each operator may have a different concept of how this is done and a different intuitive approach to one or more aspects of the operation of the plant that will yield the result of increased megawatt output. This information is then simplified and codified through the application of knowledge engineering that corresponds to the operator's experience, as indicated by a block 206. A decision tree is then generated as to the steps required in order to make a decision in response to certain observed performance, as indicated by a function block 208. A corresponding transform is then generated, as indicated by a function block 210 to "fix" the experience that led to the decision in the transform. The program then flows to an End block 212 for this particular transform. Once all of the steps have been followed, this will result in a "fixed rule."

Figure 3:
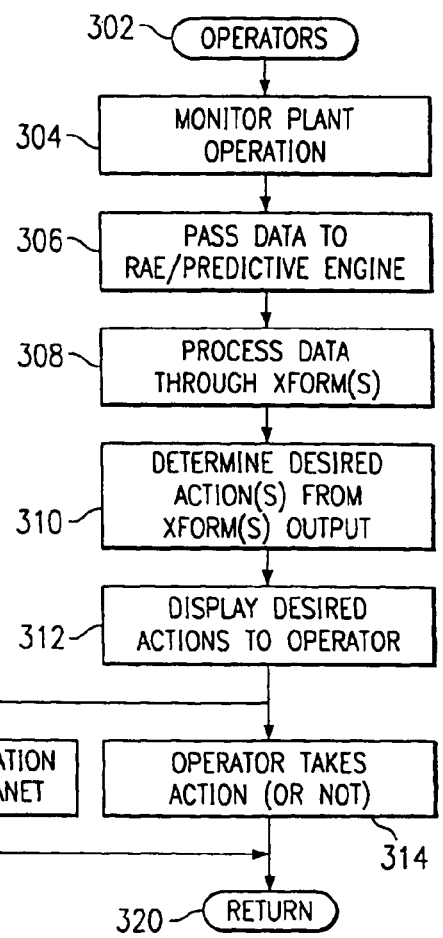
FIG. 3 illustrates a flowchart for the overall operation of the plant during maximized operation.

Referring now to FIG. 3, there is illustrated a flowchart depicting the overall operation of the plant during maximization of the operation, which is initiated at a block 302 and then proceeds to a function block 304, wherein the overall operation of the plant is monitored. Data is passed from the DCS 12 to a runtime application engine (RAE), as indicated by a function block 306, the RAE also combined with a predictive engine. The program then flows to a function block 208 to process data through the various transforms. This data is provided in a continuous manner, which data is typically "tagged" data and is contained in a tag list. This tag list defines the data that is required to be utilized by the transforms for the operation thereof. Since this data is received in a continuous manner, this is a "realtime" application.

A determined action is the result of processing data through the transforms, as indicated by a function block 310 and this action is output to the operator on the operator display 30, as indicated by a function block 312. Basically, the transform receives the data and various user defined setpoints or constants (the user being the one that generated the transforms or updates of the transforms), processes the data and constants through logic to determine a result or a condition defined by the transform output, and an then action defined as a function of the result or condition. The program then flows to a function block 314 wherein the operator takes the action at his/her discretion, there being no particular order defined when more than one action is suggested. In conjunction therewith, a full explanation is sent to a defined location on the company Intranet as a report, as indicated by a function block 318. The program then flows to a Return block 320.

Referring now to FIG. 4, there is illustrated a diagrammatic view of the decision tree that is generated prior to generation of the transform. In this decision tree generation, there are various decisions that must be gone through in the knowledge engineering operation. This example is directed toward the furnace wind box, which as described hereinbelow, is basically the pressure that exists within a wind box and. In general, the wind box, as will be described hereinbelow, constitutes the entrance of secondary combustion air to the furnace, which has pressure. This is one parameter that can constitute a "bottleneck" to the operation of the system. This is a defined bottleneck which is defined through intuitive operation of the plant via the operators. There are a number of these bottlenecks that are defined, one of which is the wind box and the associated parameters thereof. The first item that must be looked at in the disclosed example, which is a manipulatable variable (MV), is the overall price, as indicated by a block 404. There is a threshold that is defined, which threshold is variable and which constitutes a constant. The overall price for a given megawatt hour is compared with a threshold. If it exceeds the threshold, this is a true decision and if it falls below the threshold, this is a false decision. During a false decision, there will be no action taken, as indicated by a block 406. If it exceeds the threshold, this indicates that there must be something done to maximize power output at a given bottleneck (it being noted that these bottlenecks are related to the goal of the maximization process—maximum megawatts in the present disclosure). Therefore, a particular bottleneck must be examined. The decision tree will then flow to one of these bottlenecks, which is, in this example, the furnace wind box bottleneck. This is indicated by a function block 408, wherein the furnace wind box setpoint is examined to determine if it is in the safe range, a predetermined and configurable constant. These ranges are predefined as a result of discussing this aspect with the plant operators. If it is not safe, this is a false decision and an action will be generated, as indicated by a block 410 to increase the setpoint to a minimum safe value. During this operation, a plant operator may actually have the setpoint set to a level that is not safe as defined in the transform. This setpoint is the value that is utilized as a target for the operation of the plant, i.e., the operator utilizes the distributed control system to seek a particular setpoint. By setting this to the minimum safe value, this has been known by certain operators to increase megawatt output. However, if it was determined in block 408 that the setpoint was in the safe range, then the flow of the decision tree would be along a path 412 to determine if the setpoint is above a predetermined threshold. If it is in the safe range and the setpoint is less than the threshold, in this example, then this particular bottleneck will flow in the decision tree to a function block 416 to take no action. Essentially, the path from block 404 to 408 to 414 and 416 indicates that this furnace wind box is not a bottleneck and manipulations thereto will not maximize or increase megawatts that can be output. However, if it were determined in block 414 that the setpoint were greater than the threshold, this would indicate an action, as indicated by a function block 418, that the furnace wind box setpoint should be reduced to the threshold or below. Again, these actions are intuitive actions that have been utilized in the past by operators of the plant.

Referring now to FIG. 5, there is illustrated an overall diagrammatic view of the operation of the system. The plant 10 is operable to provide data in the form of manipulated variables and measured variables, the input or manipulated variables defined as u(t) and the measured variables indicated by the s(t) vector. Both of these vector inputs are received by a data distributor 502, which data distributor 502 is operable to only distribute the data necessary for the transforms, i.e., the tagged data. These are continually distributed to transform blocks 504 for transforms XFORM1, XFORM2 . . . , XFORMn. Each of these transforms is based upon a different set of rules, and may involve different operators to originally define them. Each of the transforms 504, in addition to receiving the appropriate distributed data from block 502, this being typically different data, also receives various constants and thresholds from a block 506. These are defined for each transform such that, when the associated rule is fixed, the constants and thresholds, although they could be varied, and the data are received and processed through the transform and provide as an output a result on lines 510. These results are then input to an action distribution block 512, which determines the action taken for each transform output and then generates an output for input to the display 30. Each action will have a separate requirement.

Figure 5A:
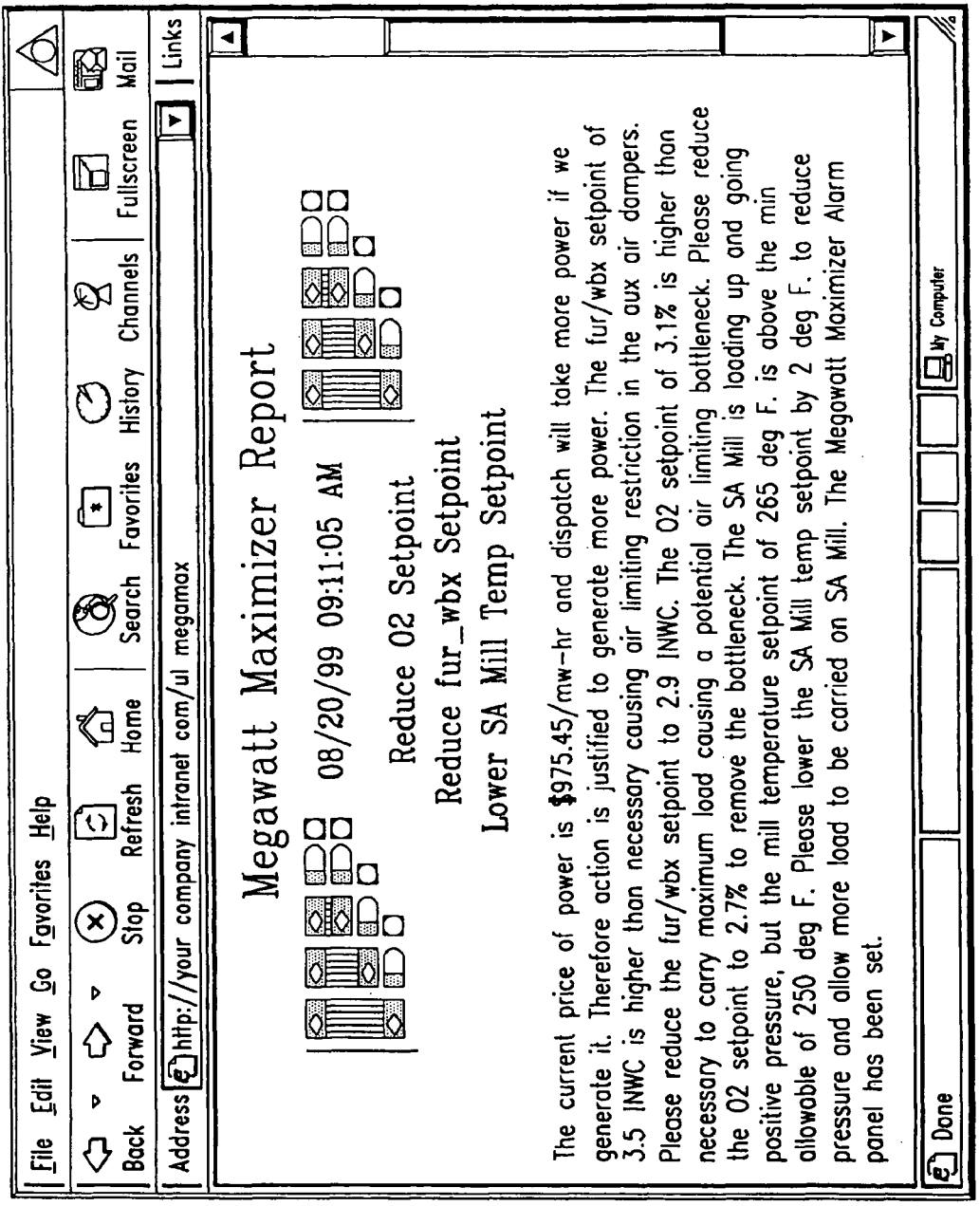
FIG. 5a illustrates a text report generated for the operator.

Typically, in the disclosed embodiment, the actions are represented on the display by action lights that indicate to the operator there is a particular action to be taken. A report generator 514 then utilizes the information regarding the action to generate a report that is sent along a communication link 516 to a user PC 518. Typically, this user PC 518 is adjacent to the operator. The operator can look at his/her computer and see what action should be taken and whether the action should be taken. An example of this is illustrated in FIG. 5*a*. In this report, it can be seen that the operator is apprized of the current price of the power and a suggestion that action is justified to generate more power. The various setpoints are given to the operator indicating that they may be higher than necessary, etc. This information can be utilized by the operator to make the various changes. Additionally, this report can be generated with a number of the transforms and the actions. The display, therefore, indicates to the operator that an action should be taken to increase megawatt output and the report will give the operator some of the reasons behind it and the suggested settings. Typically, it is an increase or a decrease of the setpoints. Additionally, the display 30 could be provided with more detail to actually display to the operator what action is to be taken. A combination of a report and/or display 30 could be utilized.

Referring now to FIG. 6, there is illustrated a block diagram of each of the transforms 504. In general, this block is a fixed rule block 602, which receives data on a line 606 and various parameters such as constants and thresholds on a line 608. This will provide on the output thereof an action.

Figure 7:
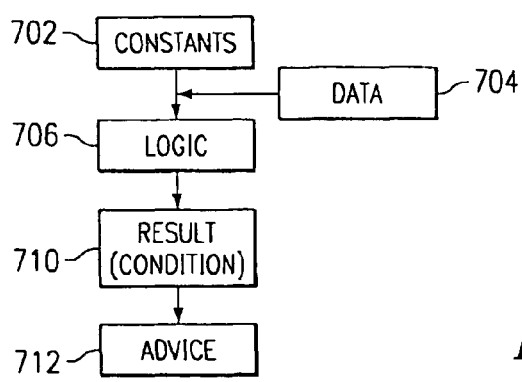
FIG. 7 illustrates a flowchart for converting a set of constants and data.

Referring now to FIG. 7, there is illustrated a flowchart illustrating how the advice is actually rendered, a block 702 indicating constants and a block 704 indicating data is input to a logic block 706. The logic block 706 is the "fixed rule" which provides on the output thereof a result, as indicated by a block 710. This result is the condition, i.e., an air-limited restriction in the auxiliary air dampers, and then this condition is converted to advice in a block 712. This advice, as described hereinabove, is predetermined through the interviews with plant operators for this particular condition. This constitutes an action.

Figure 8:
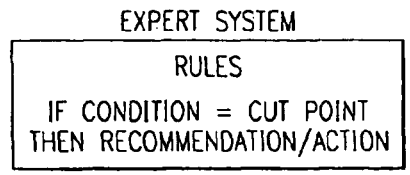
FIG. 8 illustrates a diagrammatic view of a single rule.

Referring now to FIG. 8, there is illustrated a diagrammatic view of the overall expert system, which has associated therewith rules. This is referred to as the IF and THEN statement. The first IF is with respect to the condition. This determines whether the condition is equal to the cut point, the cut point being the threshold or constant. If the condition is met, i.e., the particular condition is at a point where power can be maximized, the system will then perform the THEN operation. This operation will provide the recommendation/ action.

Figure 9:
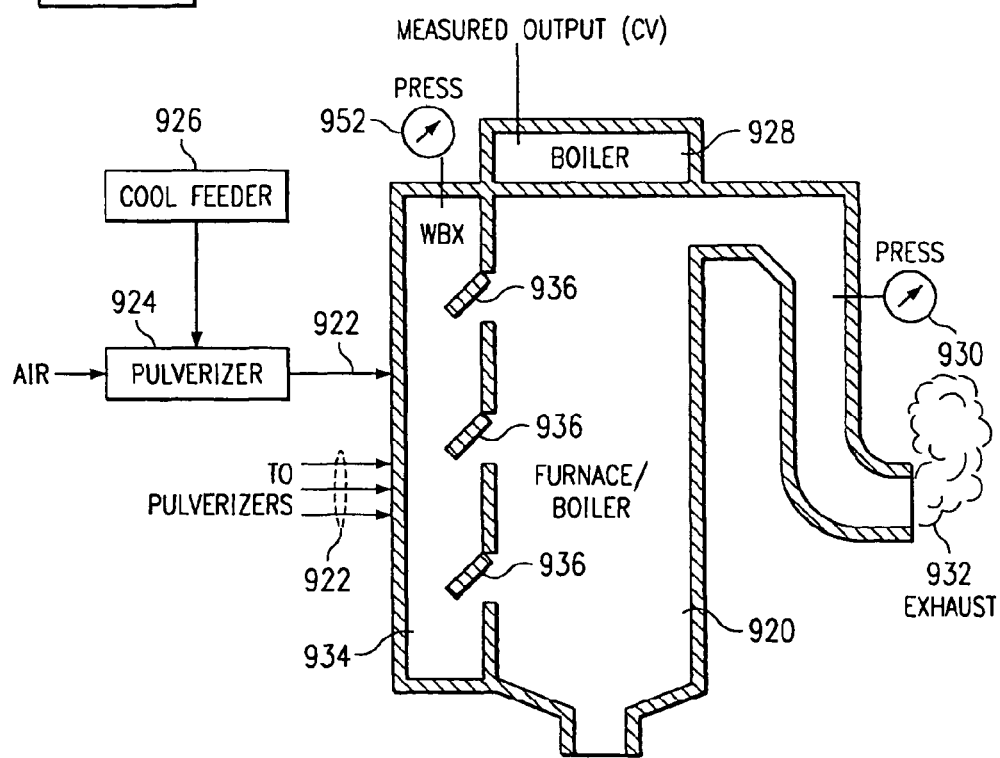
FIG. 9 illustrates a block diagram of the plant.

Referring now to FIG. 9, there is illustrated a diagrammatic view of a furnace/boiler system that has associated therewith multiple levels of coal firing. This, as set forth hereinabove, is described in U.S. patent application Ser. No. 09/224,648, filed Dec. 31, 1998, and entitled, "A METHOD FOR ON-LINE OPTIMIZATION OF A PLANT," which was incorporated herein by reference. The central portion of the furnace/boiler comprises a furnace portion 920 which is associated with a boiler 921. The furnace portion 920 has associated therewith a plurality of delivery ports 922 spaced about the periphery of the boiler at different vertical elevations. Each of the delivery ports 922 has associated therewith a pulverizer 924 and a coal feeder 926. The coal feeder 926 is operable to feed coal into the pulverizer 924 at a predetermined rate. The pulverizer 924 crushes the coal and mixes the pulverized coal with primary combustion air. The air carries the coal to the delivery ports 922 in order to inject it into the furnace portion 920. The furnace/boiler will then circulate the heated air through multiple boiler portions represented by a section 930 to provide various measured outputs (CV) associated with the boiler operation. In addition, the exhaust from the furnace will have various nitrous oxides associated therewith and this will be pulled out of the furnace with an exhaust fan 932. In general, the air that is input to the pulverizer 924 will go through an input wind box 934 which will distribute the air into the furnace/boiler. There will be provided various dampers 936 into the furnace portion 920 which can be controlled at various levels for various operations. All of these are conventional.

In general, the delivery ports 922 are disposed about the periphery of the furnace portion 920 in a tangential manner to the furnace center point to perform a swirling fireball interior to the furnace. This is what is referred to as a "tangentially fired" boiler. However, other boilers not utilizing tangential firing could be accommodated. Therefore, in order to maximize the operation of the overall system or to control the operation thereof, the various feed rates for coal feeders 926, the air input, etc., can be controlled to meter the pulverized coal into the furnace. Also, the air input to the pulverizer 924 is a combination of cold air and hot air to control the temperature thereof.

Figure 10:
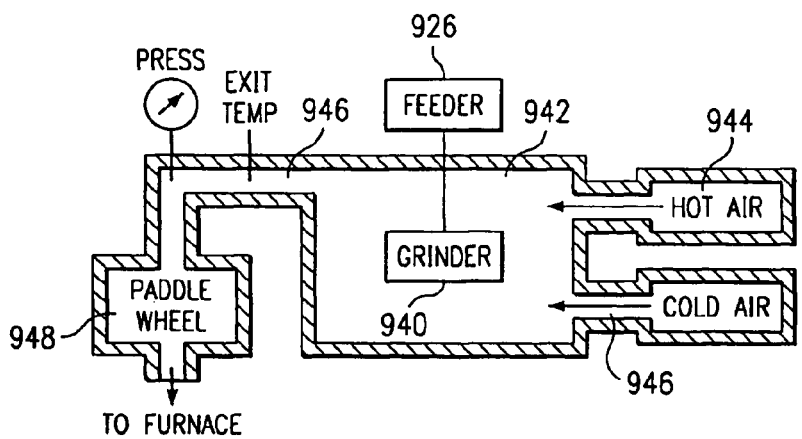
FIG. 10 illustrates a block diagram of the pulverizer.

Referring now to FIG. 10, there is illustrated a diagrammatic view of the pulverizer/coal feeder. The coal feeder 926 is operable to provide the coal to a grinder 940. The grinder 940 will grind the coal up into a "dust" or smaller particulate size into a chamber 942. Into this chamber 942 is provided hot air from a source 944, the preheated primary air, and also a cold air inlet 946 from the atmosphere. Typically, air is pulled through the furnace 920 due to the heating nature thereof and the exhaust fan 932, this being a balanced air system with regulation on the input and the output. However, the air flow of old atmospheric air and hot preheated air therethrough is manipulatable to control the operation thereof. The pulverized coal and the air mixture from the chamber 942 is then output through an exit port to the furnace. There is measured at the exit thereof an exit temperature in the inlet 946 and also a pressure. There are various delta pressures that are measured at different places along the air flow path, one also being a pressure measurement at a gauge 950 and proximate to the exhaust air device 932 and also one in the wind box 934 with a gauge 952. One manipulatable variable is the temperature set point of the exit cool/air mix leaving the pulverizer. This controls the amount of hot air entering and the amount of cold air aspirated into the chamber 942 which will affect the exit temperature from the chamber 942. By changing this, certain aspects of the pulverized coal can be changed.

Appendix A defines a transform list for the application disclosed herein. Appendix B illustrates a consolidated list of the transforms which sets forth the various transforms, logic operations, conditions and the desired advice. In Appendix B, these are set forth transforms 0–14 referred to as bits. These will be described by way of example.

In transform 0 associated with bit 0, the constant sets the $O_2$ limit at 2.5" of a column, this being the limit of the $O_2$ pressure. This constant is input to the transform block associated therewith. In the logic column, it is determined whether the $O_2$ level is greater than the limit, in addition to also determining that there is a flag set with respect to the induced draft fan, this being the fan on the inlet for forcing air into the system. This flag is typically set whenever the operation associated therewith gets above a certain percentage, such as 95%, i.e., it is reaching its limit. Once this percentage is exceeded, this constitutes a blocking operation and a flag is set. This data is one of the "tagged" data variables that provides an input. When this flag is set and the $O_2$ level is determined as exceeding the defined constant in the configurable register, then this indicates a condition wherein the $O_2$ is higher than necessary for maximizing load. The advice is to then reduce the maximum $O_2$ limit, i.e., the setpoint, by a delta value of 0.1. Also note that the constant for a given unit may be different from unit to unit as to the maximum $O_2$ limit.

In the next transform, bit 1, the exit gas temperature from the furnace is examined. A constant is set as 290° F. as a maximum temperature and then the logic examines whether the measured exit gas temperature (the gas temperature is determined as the average of three tagged data values, as indicated in the Appendix B), one of the tagged data variables, is greater than the maximum value. If so, then the condition will be that the exit gas temperature is too high and the advice will be to blow the "IK" blowers and the preheater soot blowers. This operation will actually remove soot from a certain portion of the furnace. This has been determined empirically to be a factor that could lower the exit gas temperature.

The next bit, bits 2–9 and the associated transforms, are associated with the operation of the pulverizer, or the "mill." The mills constitute four superheat side mills and four reheat side mills, it being possible to be more or less. There is determined to be a minimum exit temperature for the pulverizer or mill of 160°. This can vary depending upon a particular operator's idea of where the minimum limits should be. Typically, the pressure inside the mill should be a negative pressure since the air is being pulled out of the mill, it being remembered that this is an air-limited system. Whenever the mill pressure is greater than a value of 0.0, indicating a positive pressure, and the temperature is above the minimum limit, the action that is indicated to the operator is to reduce the temperature target by 2 F°. This results in less hot air being input thereto and an increase in the induced air. The DCS 12 will take this action when the operator dials in a new temperature setpoint decreased by 2 F°. Of course, this temperature setpoint will always have to be above the minimum limit. It has been noticed that the reason that the pressure goes high is that as the mill reaches maximum capacity, the differential pressure required to convey the coal out of the pulverizer increases, and the inlet back pressure tends to raise. Not enough air can be received from the fenced draft fan or the induced fan to create this differential pressure. By lowering the temperature setpoint, more cold air which does not require fan capacity is aspirated into the pulverizer providing more overall air flow, and reducing the back pressure. This can be continually incrementally by 2 F° . increments. Once the pressure goes negative, then no additional action will be taken, as there will be no benefit to this action, this being a perceived benefit perceived by an expert and embodied within the fixed rule. A positive pressure is a dangerous thing, in that coal and air duct can begin to exit the cold air aspiration port creating an explosive atmosphere near the pulverizer. By this technique the positive pressure is reduced, and air flow is maximized allowing even more load to be carried.

The next two bits, bits 10 and 11 and the associated transforms, are associated with the operation wherein the constant is the superheated and reheated side mills being at a desired temperature of 180°. This is a desired temperature that is configurable and determined by operators. The logic determines whether the actual measured temperature is less than the desired temperature and that the mills are operating. If so, this indicates that the mill temperature is too low for this particular rule and the action is to raise the temperature setpoint. Of course, this action would contradict the transforms associated with bits 2–9. However, this is a separate action. If the operator sees that the setpoints are too low, as indicated by the action lights associated with bits 10 and 11 being on, then the operator may want to raise the temperature. However, if for some reason the mill pressure were to go positive in any of the mills, then they would want to lower the temperatures therein. In general, it is harder to grind the coal at the colder temperatures and this would cause mechanical wear and tear on the various parts in the grinder. Therefore, unless the pressure has gone positive, it would be desirable to push the pressure toward the maximum desired temperature of 180°.

Bits 12 and 13 are associated with transforms that deal with the wind box-furnace pressure. Typically, there will always be a positive pressure differential such that the pressure of the wind box is always greater than that of the furnace, there being a negative pressure in the furnace. The dampers 936 can be adjusted to achieve the pressure differential. Typically, there will be different levels of dampers which can be adjusted. The maximum delta pressure between the wind box and the furnace is set in this example at 2.5" of water column. This is the maximum pressure than can be tolerated. The logic requires the wind box to furnace pressure to be greater than the maximum and that there be no blocking of the dampers. This blocking is a condition wherein the dampers are past a predetermined percentage closed value. If this alarm or flag is not on, and the wind box to furnace pressure is above the maximum and the induction fan blocking increase is on, indicating that it is above a certain pressure, then this indicates a condition wherein wind box restrictions exist. To remove these and increase the megawatt load, the wind box to furnace pressure target is reduced by a delta value of 0.2. This results in opening the restriction dampers on the windbox, reducing total resistance to flow, and thereby relieving the air flow bottleneck. With additional air flow, it is then possible to carry more megawatt load.

Bit 13 is associated with the feature referred to as CCOFA (Closed Coupled Over Fired Air), which is associated with a standard function in the boiler. There is provided a minimum value for the CCOFA of 70 on both the superheated side and the reheated side. If the CCOFAs are less than the minimum and the flag for the induction fan blocking increase is set, this will indicate a condition of the fact that the CCOFA is restricting flow. In this event, the DCS will be controlled, under the advice of the system, to lower the NOx target by a factor of 0.02. Typically, whenever there is a problem with CCOFA restriction, the action one would think to take would be to increase the NOx. In fact, the operators (only select ones) have noticed that a lowering of the NOx will cause the CCOFA to reduce the restriction by increasing the CCOFA above the minimum value. This will result in additional output of megawatts.

The operator is presented with a number of suggested actions via the action lights and the reports to facilitate one or more actions. These suggested actions are the result of generating transforms that codify a large amount of expert knowledge as to achieving a particular desired result and which are then converted into suggested actions to achieve the desired result or goal, such as extracting a few more megawatts. However, there may be a number of goals that are desired at different times. It could be that the operator would seek low NOx levels at a particular time or low cost at another time. The transforms are geared to a particular goal and not necessarily an overall optimized system. In the present example, such considerations as coal cost may be rendered insignificant when faced with purchasing megawatts from another utility.

Although the preferred embodiment has been described in detail, it should be understood that various changes, substitutions and alterations can be made therein without departing from the spirit and scope of the invention as defined by the appended claims. It should also be noted, that although this invention deals specifically with air limited units, the same invention could be used to relieve other bottlenecks such as environmental regulations on opacity, NOx, and thermal discharge simply by collecting and automating the operator knowledge around these other common boiler bottlenecks.

APPENDIX A

```
ProcInsFile { type "Dataset Transforms" ver "4.1.03" date
gtransform { name "!Unit3_down!" expr " Sif(!AL3IG03A! < 75, 1.0, 0.0); if the unit is down then application goes
away." }
gtransform { name "!mw_o2_limit!" expr
"SExpAve(Sreadparam(""c:\duke\mw_max\max_mw_tune.params"","mw_o2_limit"",!AL3IG03A!), 1,
SFILTER_FREEZE) ; read in tuneable parameters" }
gtransform { name "!mw_exit_gas_max!" expr
"SExpAve(Sreadparam(""c:\duke\mw_max\max_mw_tune.params"","mw_exit_gas_max"",!AL3IG03A!), 1,
SFILTER_FREEZE) " }
gtransform { name "!mw_sh_mill_min_limit!" expr
"SExpAve(Sreadparam(""c:\duke\mw_max\max_mw_tune.params"","mw_sh_mill_min_limit"",!AL3IG03A!), 1,
SFILTER_FREEZE) " }
gtransform { name "!mw_rh_mill_min_limit!" expr
"SExpAve(Sreadparam(""c:\duke\mw_max\max_mw_tune.params"","mw_rh_mill_min_limit"",!AL3IG03A!), 1,
SFILTER_FREEZE) " }
gtransform { name "!mw_sh_mill_out_desired!" expr
"SExpAve(Sreadparam(""c:\duke\mw_max\max_mw_tune.params"","mw_sh_mill_out_desired"",!AL3IG03A!), 1,
SFILTER_FREEZE) " }
gtransform { name "!mw_rh_mill_out_desired!" expr
"SExpAve(Sreadparam(""c:\duke\mw_max\max_mw_tune.params"","mw_rh_mill_out_desired"",!AL3IG03A!), 1,
SFILTER_FREEZE) " }
gtransform { name "!mw_wb_fur_max!" expr
"SExpAve(Sreadparam(""c:\duke\mw_max\max_mw_tune.params"","mw_wb_fur_max"",!AL3IG03A!), 1,
SFILTER_FREEZE) " }
gtransform { name "!mw_sh_ccofa_min!" expr
"SExpAve(Sreadparam(""c:\duke\mw_max\max_mw_tune.params"","mw_sh_ccofa_min"",!AL3IG03A!), 1,
SFILTER_FREEZE) " }
gtransform { name "!mw_rh_ccofa_min!" expr
"SExpAve(Sreadparam(""c:\duke\mw_max\max_mw_tune.params"","mw_rh_ccofa_min"",!AL3IG03A!), 1,
SFILTER_FREEZE) " }
gtransform { name "!mw_sh_stm_limit!" expr
"SExpAve(Sreadparam(""c:\duke\mw_max\max_mw_tune.params"","mw_sh_stm_limit"",!AL3IG03A!), 1,
SFILTER_FREEZE) " }
gtransform { name "!mw_GAM_check_generation_limit!" expr
"SExpAve(Sreadparam(""c:\duke\mw_max\max_mw_tune.params"","mw_GAM_check_generation_limit"",!AL3IG0
3A!), 1, SFILTER_FREEZE) " }
gtransform { name "!mw_sh_stm_time_filter!" expr
"SExpAve(Sreadparam(""c:\duke\mw_max\max_mw_tune.params"","mw_sh_stm_time_filter"",!AL3IG03A!), 1,
SFILTER_FREEZE) " }
gtransform { name "!mw_fuz_diff!" expr
"SExpAve(Sreadparam(""c:\duke\mw_max\max_mw_tune.params"","mw_fuz_diff"",!AL3IG03A!), 1,
SFILTER_FREEZE) " }
gtransform { name "!mw_nox_time_filter!" expr
"SExpAve(Sreadparam(""c:\duke\mw_max\max_mw_tune.params"","mw_nox_time_filter"",!AL3IG03A!), 1,
SFILTER_FREEZE) " }
gtransform { name "!3sa_up!" expr " Sif(!FT3FH00! >= 2.8, 1.0, 0.0) ; scan to see which feeders are up" }
gtransform { name "!3sb_up!" expr " Sif(!FT3FH06! >= 2.8, 1.0, 0.0) " }
gtransform { name "!3sc_up!" expr " Sif(!FT3FH12! >= 2.8, 1.0, 0.0) " }
gtransform { name "!3sd_up!" expr " Sif(!FT3FH18! >= 2.8, 1.0, 0.0) " }
gtransform { name "!3ra_up!" expr " Sif(!FT3FH03! >= 2.8, 1.0, 0.0) " }
gtransform { name "!3rb_up!" expr " Sif(!FT3FH09! >= 2.8, 1.0, 0.0) " }
gtransform { name "!3rc_up!" expr " Sif(!FT3FH15! >= 2.8, 1.0, 0.0) " }
gtransform { name "!3rd_up!" expr " Sif(!FT3FH21! >= 2.8, 1.0, 0.0) " }
gtransform { name "!s_fdrs_up!" expr "!3sa_up! + !3sb_up! + !3sc_up! + !3sd_up! ; perform a few calculations needed
by the logic" }
gtransform { name "!r_fdrs_up!" expr "!3ra_up! + !3rb_up! + !3rc_up! + !3rd_up!" }
gtransform { name "!Exit_gas_temp!" expr "(!AM3FH91E! + !AM3FH86E! + !AM3FH81E!) / 3 ; below we begin the
logic scans to surface and remove bottlenecks to MW production" }
gtransform { name "!Max_O2_limit_high_condition!" expr " Sif(!O031X095! > !mw_o2_limit!, Sif(!DC3AI04C! >
0.5, 1.0, 0.0) , 0.0) ; If true, the O2 setpoint is higher than necessary for max mw, recomend lower O2 sp." }
gtransform { name "!High_exit_gas_temp_condition!" expr " Sif(!Exit_gas_temp! > !mw_exit_gas_max!, 1.0, 0.0) ; If
true then the exit gas temp is getting high, recommend IK Blowers and Preheat Sootblower use" }
gtransform { name "!Positive_SA_mill_press_condition!" expr " Sif(!PT3FH24B! >= 0.0, Sif(!3sa_up! > 0.5,
Sif(!TE3FH4S! > !mw_sh_mill_min_limit!, 1.0, 0.0), 0.0), 0.0) ; if true SA mill is going positive, recomend lowering
mill temp set point" }
gtransform { name "!Positive_SB_mill_press_condition!" expr " Sif(!PT3FH30B! >= 0.0, Sif(!3sb_up! > 0.5,
Sif(!TE3FH54! > !mw_sh_mill_min_limit!, 1.0, 0.0), 0.0), 0.0) ; if true SB mill is going positive, recomend lowering
mill temp set point" }
```

APPENDIX A-continued gtransform { name "!Positive_SC_mill_press_condition!" expr " Sif(!PT3FH36B! >= 0.0, Sif(!3sc_up! > 0.5, Sif(!TE3FH60! > !mw_sh_mill_min _limit!, 1.0, 0.0), 0.0), 0.0) ; if true SC mill is going positive, recomend lowering mill temp set point" }
gtransform { name "!Positive_SD_mill_press_condition!" expr " Sif(!PT3FH42B! >= 0.0, Sif(!3sd_up! > 0.5, Sif(!TE3FH66! > !mw_sh_mill_min_limit!, 1.0, 0.0), 0.0), 0.0) ; if true SD mill is going positive, recomend lowering mill temp set point" }
gtransform { name "!Positive_RA_mill_press_condition!" expr " Sif(!PT3FH27B! >= 0.0, Sif(!3ra_up! > 0.5, Sif(!TE3FH51! > !mw_sh_mill_min_limit!, 1.0, 0.0), 0.0), 0.0) ; if true RA mill is going positive, recomend lowering mill temp set point" }
gtransform { name "!Positive_RB_mill_press_condition!" expr " Sif(!PT3FH33B! >= 0.0, Sif(!3rb_up! > 0.5, Sif(!TE3FH57! > !mw_sh_mill_min_limit!, 1.0, 0.0), 0.0), 0.0) ; if true RB mill is going positive, recomend lowering mill temp set point" }
gtransform { name "!Positive_RC_mill_press_condition!" expr " Sif(!PT3FH39B! >= 0.0, Sif(!3rc_up! > 0.5, Sif(!TE3FH63! > !mw_sh_mill_min_limit!, 1.0, 0.0), 0.0), 0.0) ; if true RC mill is going positive, recomend lowering mill temp set point" }
gtransform { name "!Positive_RD_mill_press_condition!" expr " Sif(!PT3FH45B! >= 0.0, Sif(!3rd_up! > 0.5, Sif(!TE3FH69! > !mw_sh_mill_min_limit!, 1.0, 0.0), 0.0), 0.0) ; if true RD mill is going positive, recomend lowering mill temp set point" }
gtransform { name "!4Mill_SH_temp_low_condition!" expr " Sif(!s_fdrs_up! > 3.0, Sif((!TE3FH48! < !mw_sh_mill_out_desired!) Sor (!TE3FH54! < !mw_sh_mill_out_desired!) Sor (!TE3FH60! < !mw_sh_mill_out_desired! ) Sor (!TE3FH66! < !mw_sh_mill_out_desired!), 1.0, 00), 0.0) ; If true then one or more SH mill temp is too low for 4 mill operation, recommend increase to desired" }
gtransform { name "!4Mill_RH_temp_low_condition!" expr " Sif(!r_fdrs_up! > 3.0, Sif((!TE3FH51! < !mw_sh_mill_out_desired!) Sor (!TE3FH57! < !mw_sh_mill_out_desired!) Sor (!TE3FH63! < !mw_sh_mill_out_desired! ) Sor (!TE3FH69! < !mw_rh_mill_out_desired!), 1.0, 00), 0.0) ; If true then one or more RH mill temp is too low for 4 mill operation, recommend increase to desired" }
gtransform { name "!Wind_box_restriction_condition!" expr " Sif((!O038X854! > !mw_wb_fur_max! ) Sand (!DC3AI04A! < 0.5) Sand (!DC3AI04C! > 0.5), 1.0, 0.0) ; if true then wind box restrictions exist, and recommend reduce fur/wb max by 0.2" }
gtransform { name "!SA_CCOFA_restriction_condition!" expr " Sif((!PZ3FH10! < !mw_sh_ccofa_min!) Sor (!PZ3FH11! < !mw_sh_ccofa_min!), 1.0, 0.0) ; if true then CCOFA restrictions exist, and recommend reduce NOX set point" }
gtransform { name "!RA_CCOFA_restriction_condition!" expr " Sif((!PZ3FH12! < !mw_rh_ccofa_min!) Sor (!PZ3FH13! < !mw_rh_ccofa_min!), 1.0, 0.0) ; if true then CCOFA restrictions exist, and recommend reduce NOX set point" }
gtransform { name "!CCOFA_restriction_condition!" expr " Sif(!SA_CCOFA_restriction_condition! > 0.5 Sor !RA_CCOFA_restriction_condition! > 0.5, 1.0, 0.0) ; accumulated CCOFA restriciton scan" }
gtransform { name "!add_load_condition!" expr " Sif((!Max_O2_limit_high_condition! + !High_exit_gas_temp_condition! + !Positive_SA_mill_press_condition! + !Positive_SB_mill_press_condition! + !Positive_SC_mill_press_condition! + !Positive_SD_mill_press_condition! + !Positive_RA_mill_press_condition! + !Positive_RB_mill_press_condition! + !Positive_RC_mill_press_condition! + !Positive_RD_mill_press_condition! + !4Mill_SH_temp_low_condition! + !4Mill_RH_temp_low_condition! + !Wind_box_restriction_condition! + !SA_CCOFA_restriction_condition! + !RA_CCOFA_restriction_condition! + !CCOFA_restriction_condition!) < 0.5 Sand !DC3AI04C! < 0.5, 1.0, 0.0) ; If no alrams exist, and not O2 blocking incease, then add load" }
gtransform { name "!GP3AI01A!" expr "0.0 + ( Sif(Svalid(!Max_O2_limit_high_condition!), Sif(!Max_O2_limit_high_condition! > 0.5, 1.0, 0.0), 0.0) ) + ( Sif(Svalid(!High_exit_gas_temp_condition!), Sif(!High_exit_gas_temp_condition! > 0.5, 2.0, 0.0), 0.0) ) + (Sif(Svalid(!Positive_SA_mill_press_condition!), Sif(!Positive_SA_mill_press_condition! > 0.5, 4.0, 0.0), 0.0) ) + ( Sif(Svalid(!Positive_SB_mill_press_condition!), Sif(!Positive_SB_mill_press_condition! > 0.5, 8.0, 0.0), 0.0) ) " }
gtransform { name "!GP3AI01A!" expr "!GP3AI01A! + ( Sif(Svalid(!Positive_SC_mill_press_condition!), Sif(!Positive_SC_mill_press_condition! > 0.5, 16.0, 0.0), 0.0) ) + (Sif(Svalid(!Positive_SD_mill_press_condition!), Sif(!Positive_SD_mill_press_condition! > 0.5, 32.0, 0.0), 0.0) ) " }
gtransform { name "!GP3AI01A!" expr "!GP3AI01A! + ( Sif(Svalid(!Positive_RA_mill_press_condition!), Sif(!Positive_RA_mill_press_condition! > 0.5, 64.0, 0.0), 0.0) ) + (Sif(Svalid(!Positive_RB_mill_press_condition!), Sif(!Positive_RB_mill_press_condition! > 0.5, 128.0, 0.0), 0.0) ) " }
gtransform { name "!GP3AI01A!" expr "!GP3AI01A! + ( Sif(Svalid(!Positive_RC_mill_press_condition!), Sif(!Positive_RC_mill_press_condition! > 0.5, 256.0, 0.0), 0.0) ) + (Sif(Svalid(!Positive_RD_mill_press_condition!), Sif(!Positive_RD_mill_press_condition! > 0.5, 512.0, 0.0), 0.0) ) " }
gtransform { name "!GP3AI01A!" expr "!GP3AI01A! + ( Sif(Svalid(!4Mill_SH_temp_low_condition!), Sif(!4Mill_SH_temp_low_condition! > 0.5, 1024.0, 0.0) , 0.0) ) + (Sif(Svalid(!4Mill_RH_temp_low_condition!), Sif(!4Mill_RH_temp_low_condition! > 0.5, 2048.0, 0.0) , 0.0) ) " }
gtransform { name "!GP3AI01A!" expr "!GP3AI01A! + ( Sif(Svalid(!Wind_box_restriction_condition!), Sif(!Wind_box_restriction_condition! > 0.5, 4096.0, 0.0), 0.0) ) + (Sif(Svalid(!CCOFA_restriction_condition!), Sif(!CCOFA_restriction_condition! > 0.5, 8192, 0.0), 0.0) ) ; here we are building the word to pass back to the operator display" }
gtransform { name "!GP3AI01A!" expr "!GP3AI01A! + ( Sif(Svalid(!add_load_condition!), Sif(!add_load_condition! > 0.5, 16384.0, 0.0), 0.0) ) " }
gtransform { name "!avg_sh_fdr_spd!" expr "(!FT3FH00! + !FT3FH06! + !FT3FH12! + !FT3FH18!) / !s_fdrs_up! }
gtransform { name "!avg_rh_fdr_spd!" expr "(!FT3FH03! + !FT3FH09! + !FT3FH15! + !FT3FH21!) / !r_fdrs_up! " }
gtransform { name "!Avg_sh_stm_temp!" expr "SExpAve(((!AL3BC56A! + !AL3BC56B!) / 2), !mw_sh_stm_time_filter!, SFILTER_FREEZE) " }
gtransform { name "!Steam_temp_too_low_condition!" expr " Sif((!AL3IG03A! >= !mw_GAM_check_generation_limit!) Sand (!DC3AI03D! > 0.5) Sand (!Avg_sh_stm_temp! < !mw_sh_stm_limit!), 1.0, 0.0) ; If the unit is at highrates, and is ready for optimization, and the sh steam temp is low, then recommend GAM addition" }

| Point ID | BIT | Constants | Logic | Condition | Advice |
|---|---|---|---|---|---|
| | | | MAXIMIZE, MW'S | | |
| GP3AI01A | 0 | mw_o2_limit = 2.5 | O2 > mw_o2_limit and ID Fan Blocking Increase | O2 is higher than necessary for Maximizing Load | reduce Max O2 limit by 0.1 |
| | 1 | mw_exit_gas_max = 200 | Exit_Gas_Temp > mw_exit_gas_max Exit_Gas_Temp = (AM3FH91E + AM3FH8GE + AM3FH81E)/3 | Exit Gas Temperature to high | Blow the IK Blowers and the Preheater Sootblowers |
| | 2 | mw_sh_mill_min_limit = 100 | SA Mill Press > 0.0 & > mw_sh_mill_min_limit | SA Mill going positive | Reduce SA Mill Temp Target 2 deg F. |
| | 3 | | SB Mill Press > 0.0 & > mw_sh_mill_min_limit | SB Mill going positive | Reduce SB Mill Temp Target 2 deg F. |
| | 4 | | SC Mill Press > 0.0 & > mw_sh_mill_min_limit | SC Mill going positive | Reduce SC Mill Temp Target 2 deg F. |
| | 5 | | SD Mill Press > 0.0 & > mw_sh_mill_min_limit | SD Mill going positive | Reduce SD Mill Temp Target 2 deg F. |
| | 6 | mw_rh_mill_min_limit = 100 | RA Mill Press > 0.0 & > mw_rh_mill_min_limit | RA Mill going positive | Reduce RA Mill Temp Target 2 deg F. |
| | 7 | | RB Mill Press > 0.0 & > mw_rh_mill_min_limit | RB Mill going positive | Reduce RB Mill Temp Target 2 deg F. |
| | 8 | | RC Mill Press > 0.0 & > mw_rh_mill_min_limit | RC Mill going positive | Reduce RC Mill Temp Target 2 deg F. |
| | 9 | | RD Mill Press > 0.0 & > mw_rh_mill_min_limit | RD Mill going positive | Reduce RD Mill Temp Target 2 deg F. |
| | 10 | mw_sh_mill_out_desired = 180 | SH Mill_Out_Temp < mw_sh_mill_out_desired AND 4 SH Mill operation | 4 SH Mill Temperature to low | Raise temperature setpoint to 180 |
| | 11 | mw_rh_mill_out_desired = 180 | Mill_Out_Temp < Mill_Out and 4 RH Mill operation | 4 RH Mill Temperature to low | Raise temperature setpoint to 180 for all RH Mills |
| | 12 | mw_wb_fur_max = 2.5 | WB/Fur > mw_wb_fur_max and wb_min block not on & ID Fan Blocking increase | wind box restrictions exist | reduce fur/wb max by 0.2 |
| | 13 | mw_sh_ccofa_min = 70 | SH or RH CCOOFAs < mw_ccofa_min | COOFAs restricting flow | Lower NOx Target by 0.02 |
| | | mw_rh_ccofa_min = 70 | & ID Fan Blocking increase | | |
| | 14 | | bits 0–13 are clear & ID fans not blocking increase | Load can be added | Add Load |
| | | | Model Optimizer | | |
| GP3AI01B | 0 | | avg SH fdr_speed > max fdr speed avg RH_fdr_speed > max fdr speed | Feeder bias defeated | increase Max Fdr Speed Above the avg_sh_fdr_spd and avg_rh_fdr_spd |
| | 1 | mw_sh_stm_limit = 1050 mw_GAM_check_generation_limit = 200 mw_sh_stm_time_filter = 0.00832 [1] | Once the Unit is Ready for Optimization, and While MW > mw_GAM_check_generation_limit IF time_filtered avg SH_Temp < mw_sh_stm_limit | Steam Temps too low | Consider GAM usage |
| | 2 | | O2 Min > O2 Max | Infeasible O2 Constraints | increase O2 Max = O2 Min |
| | 3 | | FDR spd MIN > FDR spd MAX | Infeasible FDR constraints | increase FDR spd Max or decrease FDR spd Min % |
| | 4 | | WB/Furn Min > WB/Furn Max | Infeasible WB/Furn Constraints | increase WB/Furn Max = WB/Furn Min |

What is claimed is:

1. A method for controlling a system to achieve desired operating results, the system controlled by a control system, wherein an operator of the system is operable to provide setpoints defining desired operating goals of the system, comprising the steps of:

measuring select operating parameters of the system;

providing a plurality of transforms that define select setpoints to be input by the operator of the system as a function of the measured select operating parameters, wherein each of the transforms is associated with a portion of the measured select operating parameters and with a predetermined condition of the system that is a function of the portion of the measured select operating parameters, and each of the transforms has embedded therein intuitive actions taken by actual operators of the system to provide setpoints for an associated condition, and wherein each of the transforms is operable to determine if the predetermined and associated condition exists in the system, which would warrant an associated setpoint being set;

processing the measured select operating parameters through the associated transforms to determine for each of the transforms if the associated condition is present;

providing to the operator an indication that the condition associated with any of the transforms is present and for which transform; and suggesting to the operator the setpoint to be set for the associated indication and a suggested value thereof.

2. The method of claim 1, and further comprising the step of controlling the operation of the system in accordance with one of the suggested setpoints by setting one or more of the setpoints suggested to the operator.

3. The method of claim 1, wherein the step of providing an indication comprises activating a panel display to provide a visual display to the operator which is able to indicate to the operator which of the transforms had the associated conditions met.

4. The method of claim 3, wherein the step of suggesting comprises generating a report to the operator defining suggested control steps to be taken for the operation of the system.

5. The method of claim 1, wherein the transforms comprise a set of rules determined by a history of operation of the system to achieve in part the desired operating results.

6. The method of claim 5, wherein the step of providing the transforms comprises:

assembling a history of various observations of the operation of the system and setpoints to be set that have been observed to achieve a move of the system toward the desired operating results;

defining a decision tree that has embedded therein measurable variables of the system and/or inputs to the system and logic steps to define each of the assembled observations; and fixing the decision tree path into a fixed rule as a transform operating on the associated measurable variables of the system and/or inputs to the system.

7. The method of claim 1, wherein one of the select operating parameters of the system is a commercial operating parameter that defines the commercial operation of the system.

8. The method of claim 7, wherein the system is a power system and the commercial aspect constitutes the cost of generating power.

* * * * *

UNITED STATES PATENT AND TRADEMARK OFFICE
CERTIFICATE OF CORRECTION

PATENT NO. : 7,058,483 B2
APPLICATION NO. : 10/755719
DATED : June 6, 2006
INVENTOR(S) : John P. Havener It is certified that error appears in the above-identified patent and that said Letters Patent is hereby corrected as shown below:

<u>Title page:</u> Col. 1

<u>Item (73) Assignee:</u>
please delete "Pavilion Technologies, Austin, TX (US)" and substitute
-- Pavilion Technologies, Inc., Austin, TX (US) --.

Signed and Sealed this

Twenty-first Day of November, 2006

JON W. DUDAS
*Director of the United States Patent and Trademark Office*